(12) United States Patent
Bowers et al.

(10) Patent No.: US 10,907,671 B2
(45) Date of Patent: ***Feb. 2, 2021

(54) FASTENER FOR SECURING TOGETHER TWO PANELS

(71) Applicants: Ned C. Bowers, Mount Dora, FL (US); Russell Ortner, Apopka, FL (US)

(72) Inventors: Ned C. Bowers, Mount Dora, FL (US); Russell Ortner, Apopka, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/144,166

(22) Filed: Sep. 27, 2018

(65) Prior Publication Data

US 2019/0093687 A1 Mar. 28, 2019

Related U.S. Application Data

(63) Continuation of application No. 14/256,436, filed on Apr. 18, 2014, now Pat. No. 10,087,964.

(60) Provisional application No. 61/813,795, filed on Apr. 19, 2013.

(51) Int. Cl.
*F16B 5/02* (2006.01)
*F16B 37/06* (2006.01)

(52) U.S. Cl.
CPC .......... *F16B 5/0208* (2013.01); *F16B 37/067* (2013.01)

(58) Field of Classification Search
CPC .......... F16B 5/10; F16B 21/04; F16B 37/067; F16B 39/028; F16B 5/0208
USPC .......................................... 411/549–551, 553
See application file for complete search history.

(56) References Cited

U.S. PATENT DOCUMENTS

| | | |
|---|---|---|
| 905,294 A | 12/1908 | DrGroff |
| 2,283,526 A | 5/1942 | Albin |
| 2,846,411 A | 11/1949 | Huelster |
| 2,670,021 A | 2/1954 | Torresen et al. |
| 2,878,542 A | 3/1959 | Mills et al. |
| 2,881,499 A | 4/1959 | Mills et al. |
| 2,922,211 A | 1/1960 | Boyd |
| 3,488,815 A | 1/1970 | Metz |
| 3,495,307 A | 2/1970 | Metz |
| 4,378,615 A | 4/1983 | Gunther |
| 5,658,107 A | 8/1997 | Smith |

(Continued)

OTHER PUBLICATIONS

Alcoa, "2600/2700 Series. General Purpose Stud Assemblies" pp. 1 of 1 no date available.

*Primary Examiner* — Flemming Saether
(74) *Attorney, Agent, or Firm* — Wolter Van Dyke Davis, PLLC; Robert L. Wolter

(57) ABSTRACT

A fastener is provided for securing a first panel to a second panel. The fastener includes a stud insertable through apertures in the first and second panels. The fastener further includes a pivoting handle assembly with a handle operatively connected to a stud head and pivotal between an upright position generally perpendicular to the first panel, and a folded position generally parallel to the first panel. A biasing mechanism is connected to the stud head and the handle that biases the handle outward relative to the stud head. A locking pin is connected to the stud head and the handle and is in connection with the biasing mechanism to hold the handle in the upright position or the folded position. A fastener is also provided for securing together the first and second panels, including a grommet, a receptacle and an insert in threaded engagement with an interior of the receptacle.

6 Claims, 9 Drawing Sheets

(56) References Cited

U.S. PATENT DOCUMENTS

| | | | |
|---|---|---|---|
| 5,688,093 A | 11/1997 | Bowers | |
| 5,690,460 A | 11/1997 | Attanasio | |
| 5,716,180 A | 2/1998 | Bowers | |
| 5,795,122 A | 8/1998 | Bowers | |
| 7,997,843 B2 | 8/2011 | Bowers | |
| 8,282,329 B2 | 10/2012 | Bowers et al. | |
| 8,490,358 B2 | 7/2013 | Bowers et al. | |
| 8,745,951 B2 | 6/2014 | Bowers et al. | |
| 8,757,952 B2 | 6/2014 | Bowers et al. | |
| 10,087,964 B2 * | 10/2018 | Bowers | F16B 37/067 |

* cited by examiner

FASTENER FOR SECURING TOGETHER TWO PANELS

CROSS-REFERENCE TO RELATED APPLICATIONS

This application claims priority to U.S. patent application Ser. No. 14/256,436 filed on Apr. 8, 2014, which claims priority to U.S. Provisional Application No. 61/813,795 filed on. Apr. 19, 2013 and incorporated by reference herein in its entirety.

BACKGROUND OF THE INVENTION

The present invention relates to quick connect fasteners for holding panels, other components, together and, more particularly, to ¼ turn fasteners which can be fastened and unfastened quickly and repeatedly.

As can be seen from Prior Art FIG. 1, fasteners 110 of the ¼ turn type have been known which include a grommet 112, a stud 114 and a receptacle 116. The fastener 110 holds together two panels 118 and 120, with adjacent sides of the panels in contact with one another, by extending through openings 122 and 124 formed in the panels to receive the fastener. The grommet 112 has a cylindrical body 126 sized to extend through the opening 122 in one of the panels 118, usually an outer panel, and one end of the cylindrical body 126 has a radially outward extending flange 128 to engage the outer surface of the outer panel 118. The stud 114 has a shaft 130, a head 132, a cross pin 134 extending through the shaft at an end opposite to the head, a cup member 136 slidable along the shaft and a spring on the shaft between the head and cup member and received in the cup member.

The receptacle 116 of the fastener 110 has a generally cylindrical body 142 and a flange 144 projecting radially outward from one end of the body. The receptacle body 142 defines a central opening and has cam and locking surfaces 146 defined at an end opposite the radially outward extending receptacle flange 144. The panels 118 and 120 are brought together so that the stud 114 and the receptacle 116 are in alignment. The head 132 of the stud 114 is engaged by a turning tool pushed inwardly against the bias of the spring, and turned ¼ turn with the cross pin 134 of the 130 in engagement with the cam and locking surfaces 146 of the receptacle 116. This action locks the fastener 110 in place with the two panels 118 and 120 in secure engagement with one another.

Although the fastener 110 employs a turning tool to turn the stud head 132 and engage the cross pin 134 with the receptacle 116, other such fasteners may include a folding handle pivotally attached to the stud head, to perform this step. In an upright position, the folding handle is used to turn the stud head and can then be pivoted out of the way into a folded position after the stud head is turned. For example, folding rings have been used as such a folding handle in ¼ turn fasteners and include projections which are received within the stud head, to pivotally attach the folding rings to the stud head. However, one drawback of these folding handles is they may become dislodged from the stud head with minimum torsional force while being used to turn the stud head.

Another drawback of such ¼ turn fasteners is that they may require access to the back of the supporting panel 120, in order to secure the flange 144 to the panel 118. However, in many applications one is not able to access certain areas of a panel. Although fastening devices that include fastener receptacles that are referred to as rivet nuts or nutserts are known which do not require access to a back of the supporting panel, these fastener receptacles (rivet nuts or nutserts) are not capable of direct engagement with such ¼ turn fasteners.

BRIEF DESCRIPTION OF THE INVENTION

In one embodiment, a fastener is provided for securing a first panel to a second panel, where the first panel and the second panel each include an aperture for receiving the fastener. The fastener includes a stud insertable through the aperture in the first panel and engageable with the second panel to secure the first panel to the second panel. The stud has one end that is insertable through the apertures and a stud head distal to the end. The fastener further includes a pivoting handle assembly with a handle operatively connected to the stud head. The handle is pivotal between an upright position in which the handle is generally perpendicular to the first panel, and a folded position in which the handle is generally parallel to the first panel. The fastener further includes a biasing mechanism connected to the stud head and the handle that biases the handle outward relative to the stud head. The fastener further includes a locking pin connected to the stud head and the handle and in connection with the biasing mechanism to hold the handle in the upright position or the folded position.

In another embodiment, a fastener is provided for securing a first panel to a second panel, where the first panel and the second panel each include an aperture for receiving the fastener. The fastener includes a stud insertable through the aperture in the first panel and engageable with the second panel to secure the first panel to the second panel. The stud has one end that is insertable through the apertures and a stud head distal to the end. The fastener also includes a pivoting handle assembly that has a handle operatively connected to the stud head. The handle is pivotal between an upright position in which the handle is generally perpendicular to the first panel, and a folded position in which the handle is generally parallel to the first panel. The pivoting handle assembly also includes a biasing mechanism disposed in a central boring of a block of the stud head, and an axle of the handle disposed within a slot of the block, where the axle is disposed perpendicular to the biasing mechanism such that the biasing mechanism biases the axle outward relative to the stud head.

In another embodiment, a fastener is provided for securing together a first panel to a second panel, where the first panel and the second panel each include an aperture for receiving the fastener. A first side of the first panel and the second panel are facing each other, and a second side of each is facing away from each other. The fastener includes a grommet with an opening and a radially outwardly extending flange for engaging the second side of the first panel. The fastener also includes a receptacle that is a rivet nut mounted to the first side of the second panel and with a central opening facing the first side of the first panel and aligned with the respective apertures of the first panel and second panel. The fastener further includes an insert in threaded engagement with an interior surface of the rivet nut receptacle and the insert having cam and locking surfaces for engaging a cross pin of a stud having been inserted through the grommet.

BRIEF DESCRIPTION OF THE DRAWINGS

These and other advantages of the invention will become more apparent from the following description in view of the drawings. Similar structures illustrated in more than one figure are numbered consistently among the drawings.

DESCRIPTION OF THE INVENTION

Figure 2:
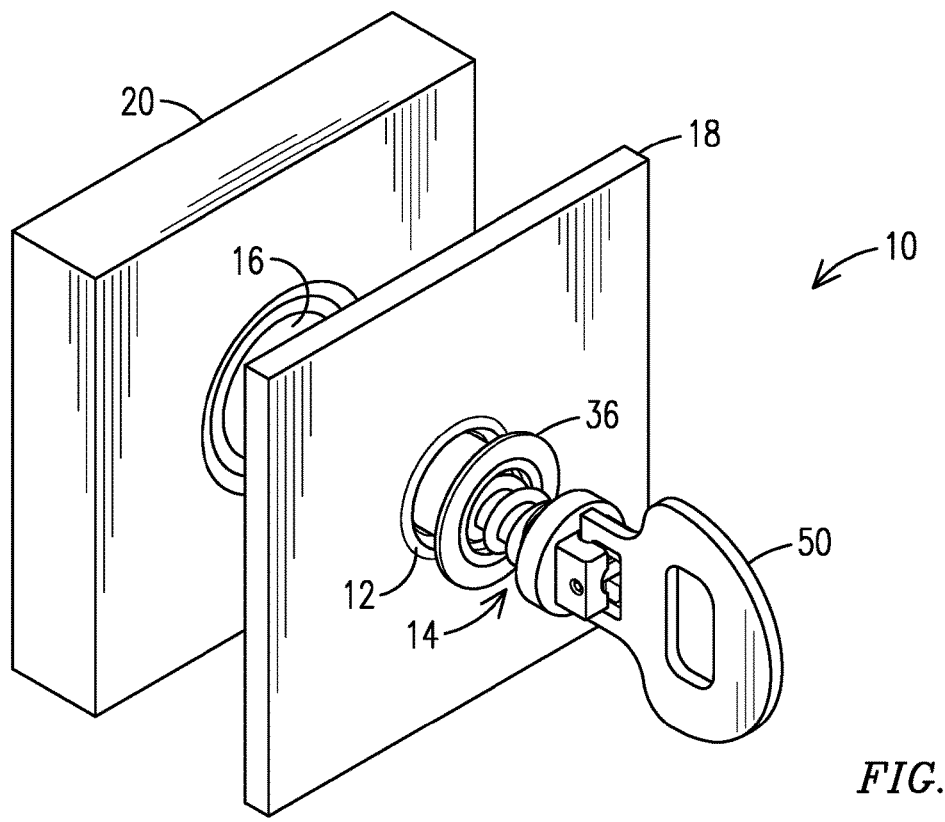
FIG. 2 is a perspective view of a fastener installed in two panels according to embodiments of the present invention.
Figure 3:
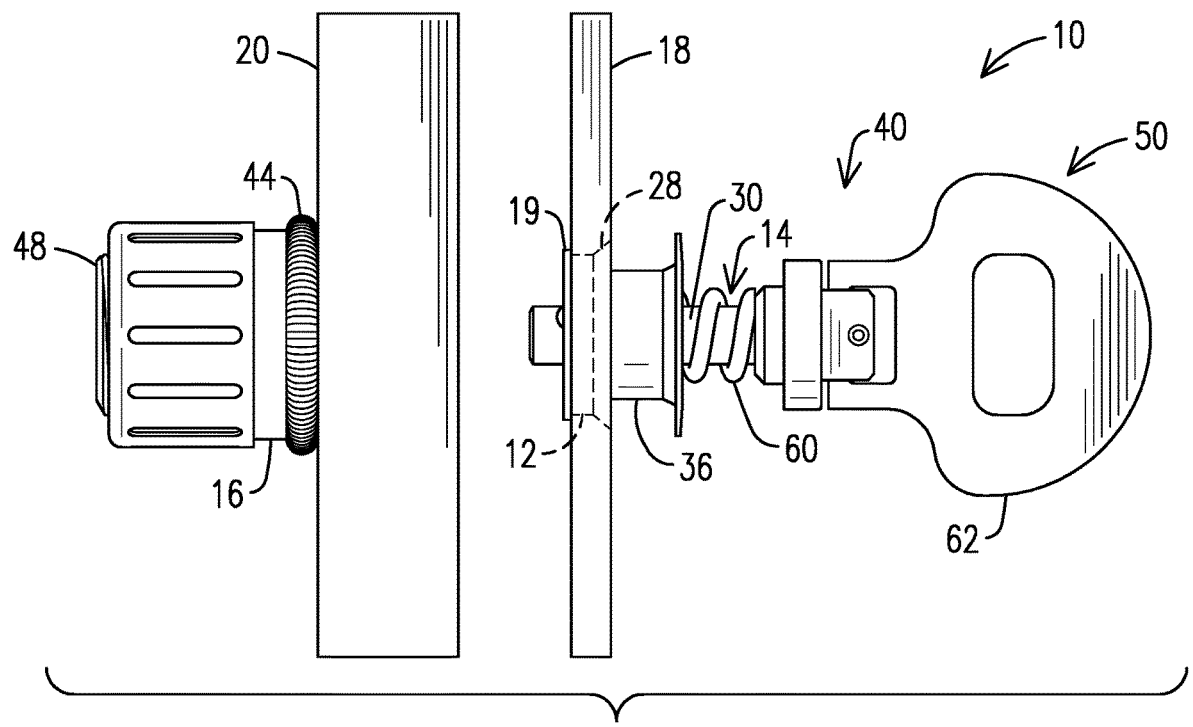
FIG. 3 is a partial section view of the fastener according to embodiments of the present invention.

As can be seen from FIGS. 2 and 3, a fastener, which is designated generally by the reference numeral 10, is of the ¼ turn type, having a grommet 12, a stud 14, and a receptacle 16, and may incorporate the various inventions described and claimed herein. While components of the invention are described in reference to a ¼ turn fastener, the inventions and their parts may be used with other types of quick-release fasteners such as 2× and 4× threaded fasteners.

The fastener 10 holds together two panels 18 and 20, with adjacent sides of the panels in contact with one another, by extending through openings formed in the panels to receive the fastener 10. While the inventions may be described in terms of securing together two panels, the inventions are not intended to be so limited and could be used to secure together various types of components of structures, machines etc.

The grommet 12 has a cylindrical body sized to extend through the opening in one of the panels 18, usually an outer panel, and one end of the cylindrical body has a radially outward extending flange 28 to engage the outer surface of the outer panel 18. The other end of the cylindrical body has a radially outwardly extending shoulder or flange to engage a retaining ring 19 for retaining the grommet 12 on the outer panel 18.

Figure 6:
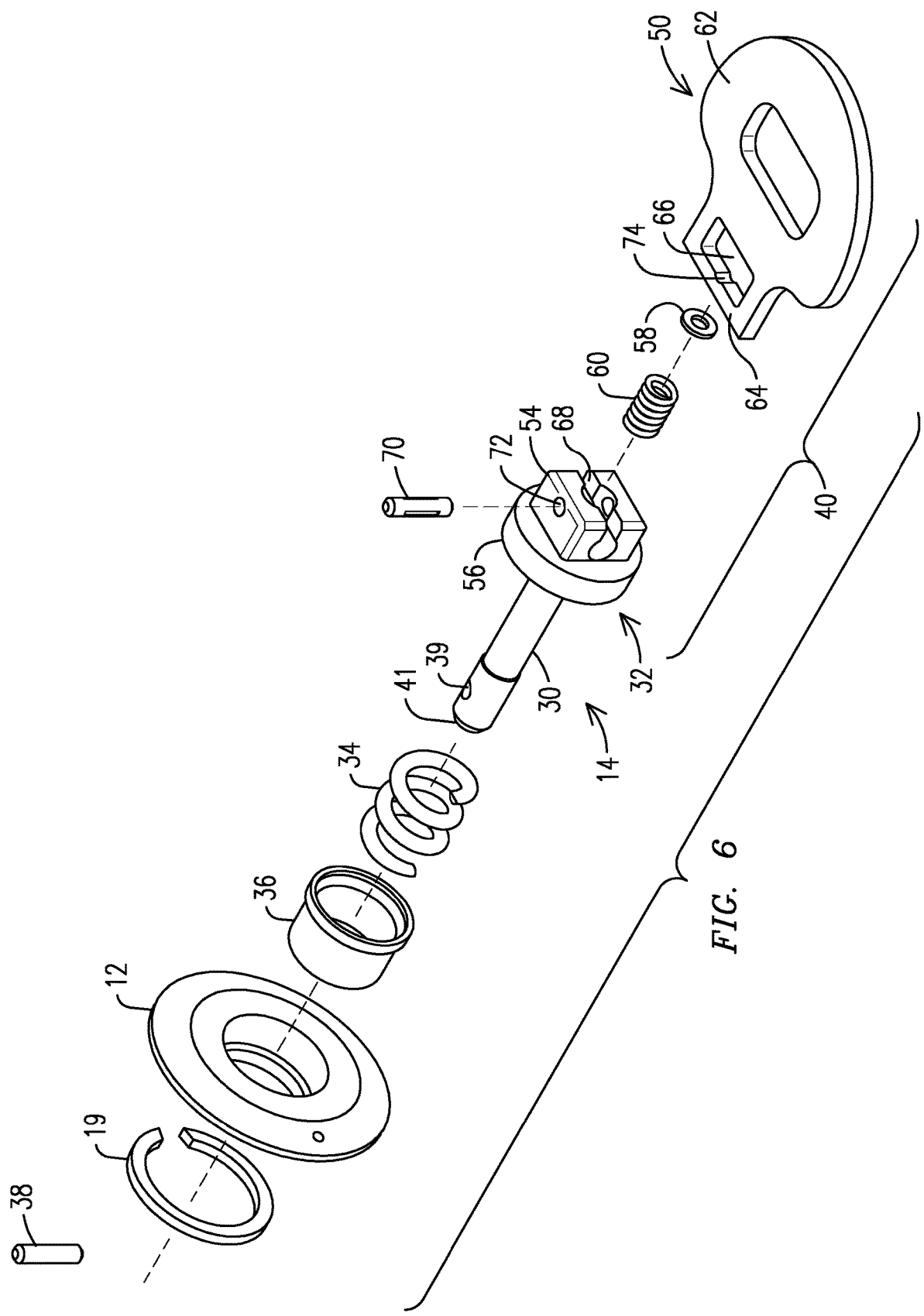
FIG. 6 is an exploded view of the pivoting handle assembly and stud/cup retainer assembly according to embodiments of the present invention.
Figure 7A:
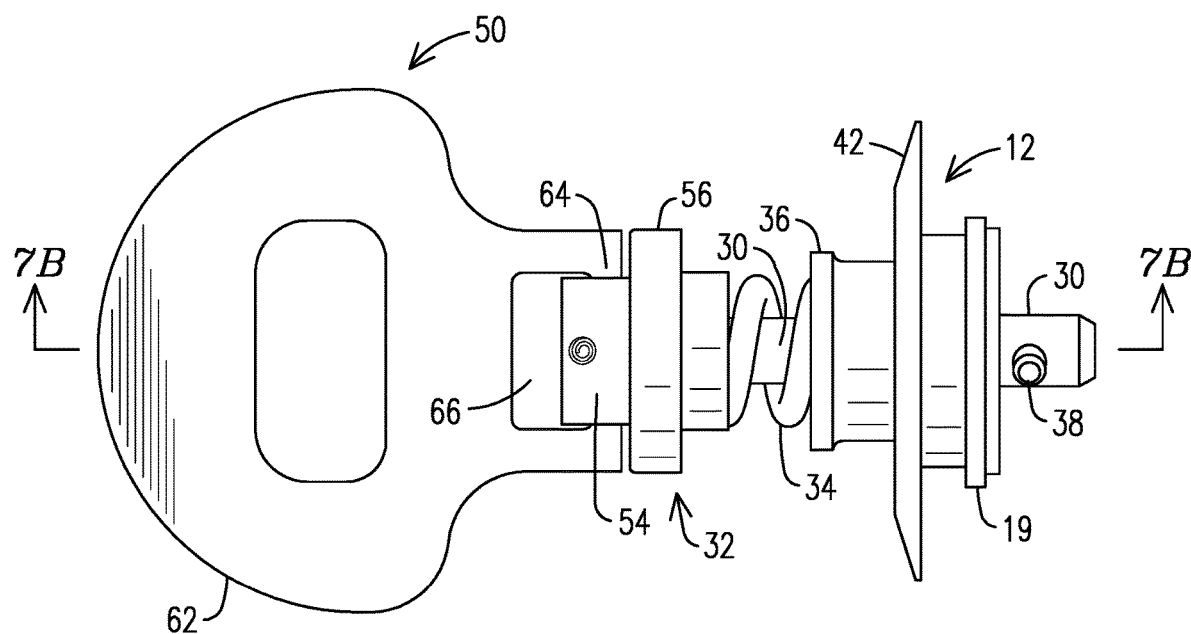
FIGS. 7A-7B include views of the pivoting handle assembly according to embodiments of the present invention.
Figure 7B:
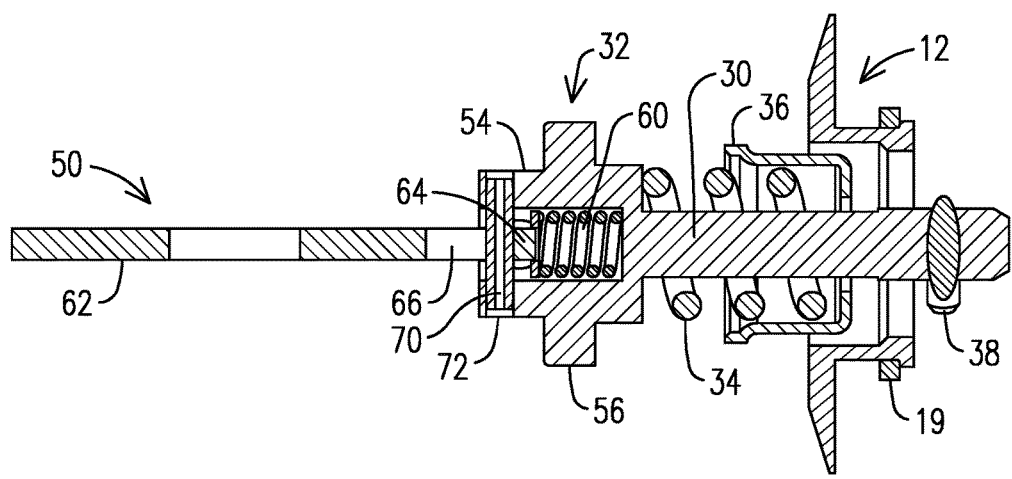
Figure 8A:
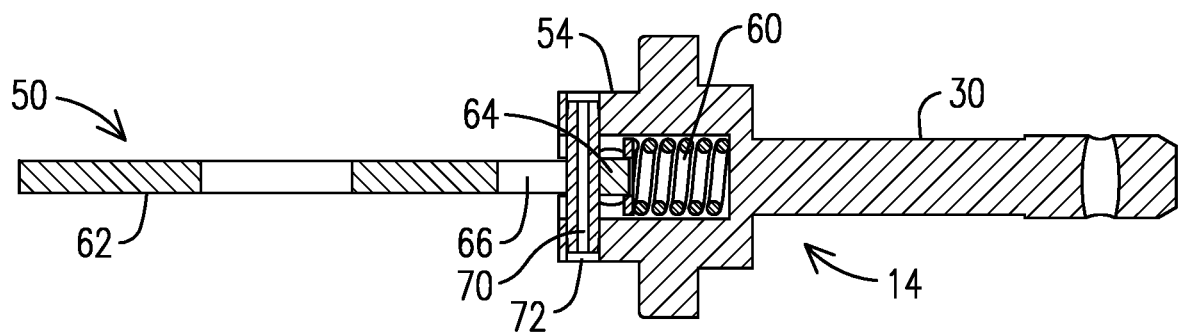
FIGS. 8A-8B include sectional views of the pivoting handle assembly according to embodiments of the present invention.
Figure 8B:
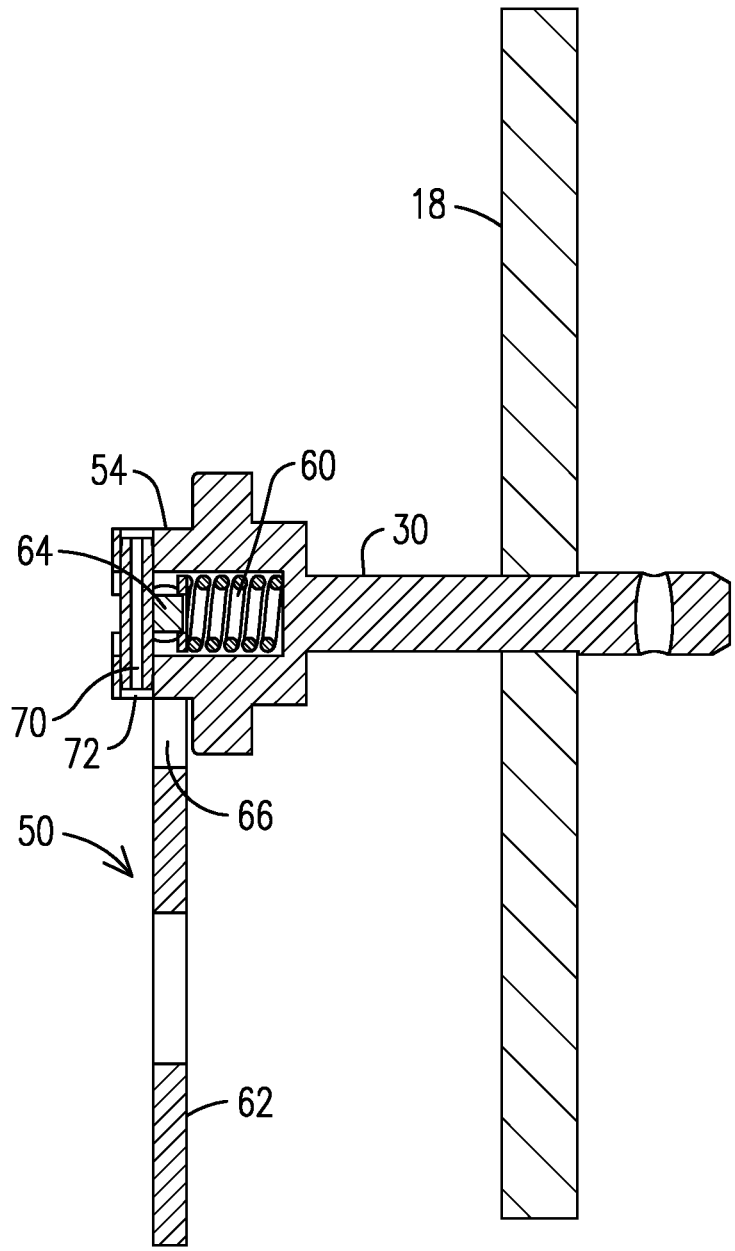

As illustrated in FIG. 6, the stud 14 has a shaft 30, a head 32 and a cross pin 38 extending through an opening 39 in the shaft 30 at an end 41 opposite to the head 32. A cup member 36 is slidable along the shaft 30 and a spring 34 on the shaft 30 between the head 32 and cup member 36 biases the stud 14 relative to the panel 18. This arrangement keeps the head 32 of the stud 14 biased by the spring 34 slightly outward from the radially outward extending flange 28 at the outer side of the outer panel 18. The end 41 of the shaft 30 extends through an opening in the outer panel 18, and the cross pin 38 positioned in the opening 39 in the shaft 30, prevent the assembly of the grommet 12 and the stud 14 from separating from the outer panel 18.

As shown in FIGS. 6-11, the stud 14 includes a pivoting handle assembly 40, and as will be explained in more detail below the handle assembly 40 controls the manipulation of the stud 14 relative to the receptacle 16 to secure the panels 18 and 20. The receptacle 16 may be the type disclosed in U.S. Pat. No. 5,716,180 (the '180 patent); U.S. Pat. No. 5,795,122 (the '122 patent); U.S. Pat. No. 7,997,843 (the '843 patent); and, U.S. Pat. No. 8,282,329 (the '329 patent), which are incorporated herein by reference. In another embodiment, the receptacle 16 shown in FIGS. 3, 4A-4C and 5A-5D may be of a rivet nut type installed on a backside of panel 20 that may not otherwise be accessible after installation of panel 20.

Figure 1:
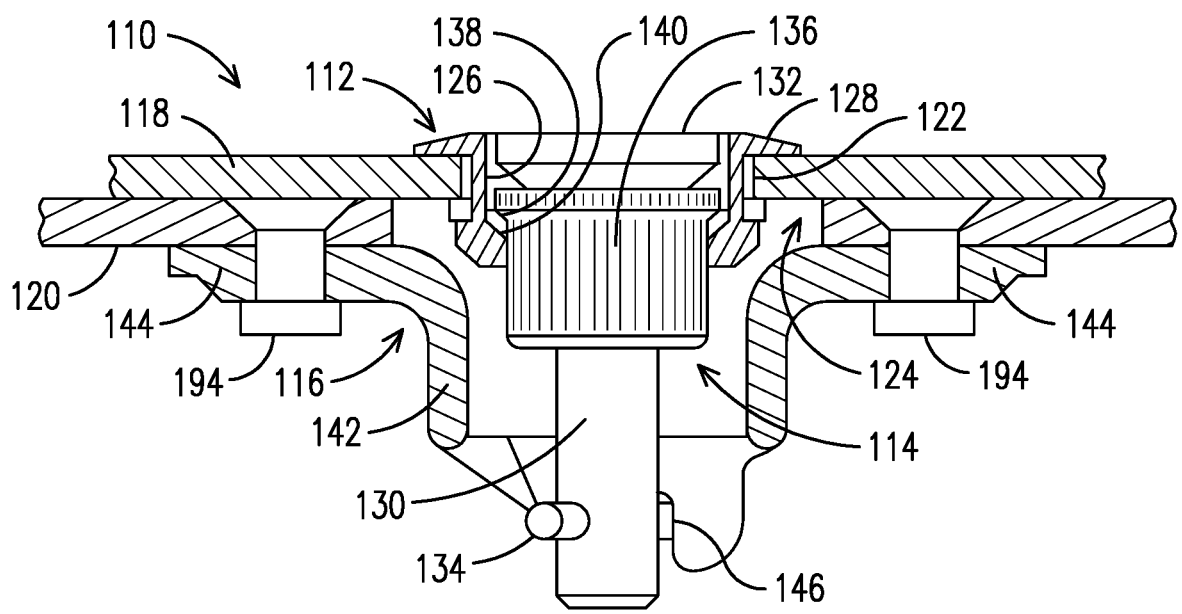
FIG. 1 is a cross section of a prior art fastener holding two panels together.
Figure 4D:
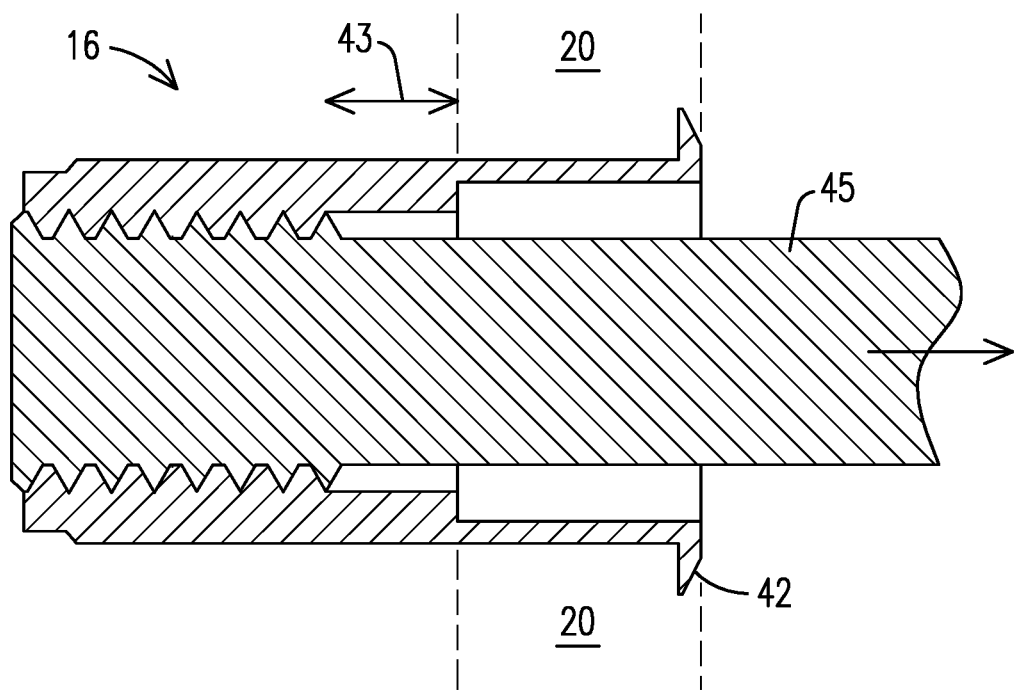
FIG. 4D includes a view of the receptacle of FIGS. 4A-4C with a rivet screw according to embodiments of the present invention.
Figure 4A:
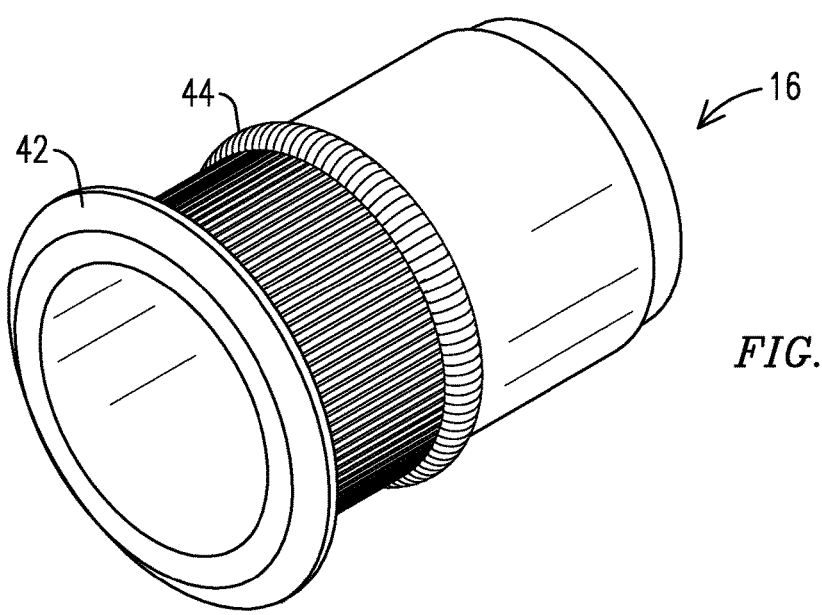
FIGS. 4A-4C include various views of a receptacle with a fastener insert according to embodiments of the present invention.
Figure 4B:
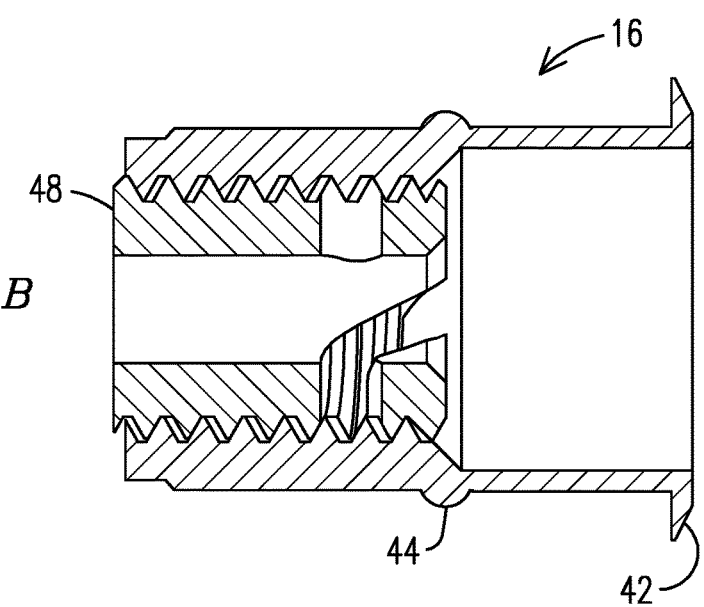
Figure 4C:
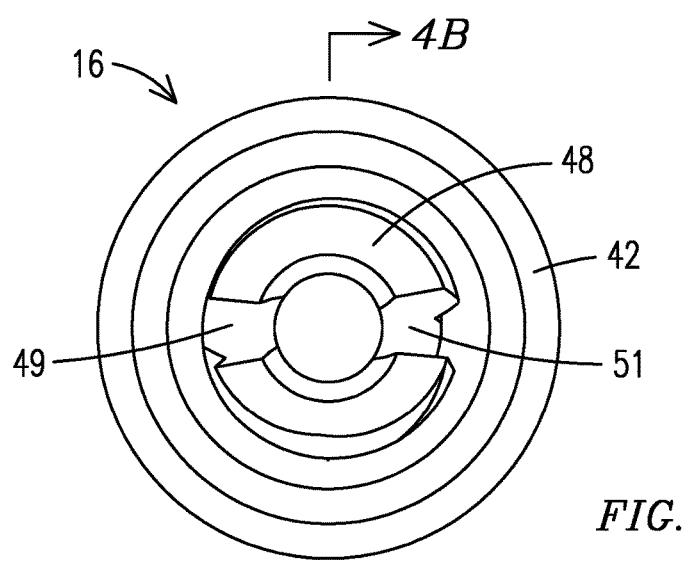

More specifically, the receptacle 16 (or rivet nut) is inserted through a hole in the inside panel 20, which may have a counter bore in which flange 42 is seated. As illustrated in FIGS. 4C-4D, a rivet screw or tool 45, which is known to those skilled in the art for securing rivet nuts to panels, frame members and the like, is then inserted and threaded into an internally threaded portion of the receptacle 16 to crimp the non-threaded outer surface 43 of the receptacle against a backside of the panel 20 forming the bulge 44 anchoring the receptacle 16 to the panel 20, based on adjustment of the tool 45 along the internally threaded portion of the receptacle 16. After the tool 45 is removed, an insert 48 (or barrel member) is then passed through a central opening of the receptacle 16 and. secured within the receptacle 16, similar to those inserts or barrel members described in the '180, '122, '843 and '329 patents having external threads that engage the internal threads of the receptacle 16. The insert 48 also includes a central opening large enough to receive the end 41 of the shaft 30 of the stud 14. As illustrated in FIGS. 4B-4C, diametrically opposed curved slots 49, 51 are provided on the insert 48 for receiving the cross pin 38 of the stud 14. These slots 49, 51 form cam and locking surfaces leading to apices beyond which the slots 49, 51 curve back toward and end of the insert 48 facing the grommet 12 to define locking surfaces for the cross pin 38. Depending on the panel 18, 20 thicknesses and the length of the stud shaft 30, the insert 48 is threaded into the receptacle 16 until the insert 48 is positioned at a correct depth setting, such that the slots 49, 51 are positioned to define the cam and locking surfaces with the cross pin 38.

Figure 5A:
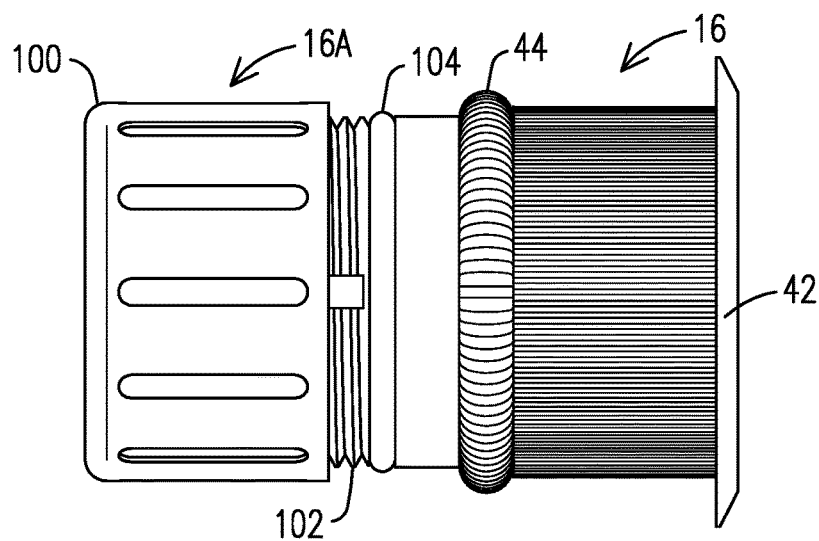
FIGS. 5A-5D include various views of a receptacle with a fastener insert and a lock cap according to embodiments of the present invention.
Figure 5B:
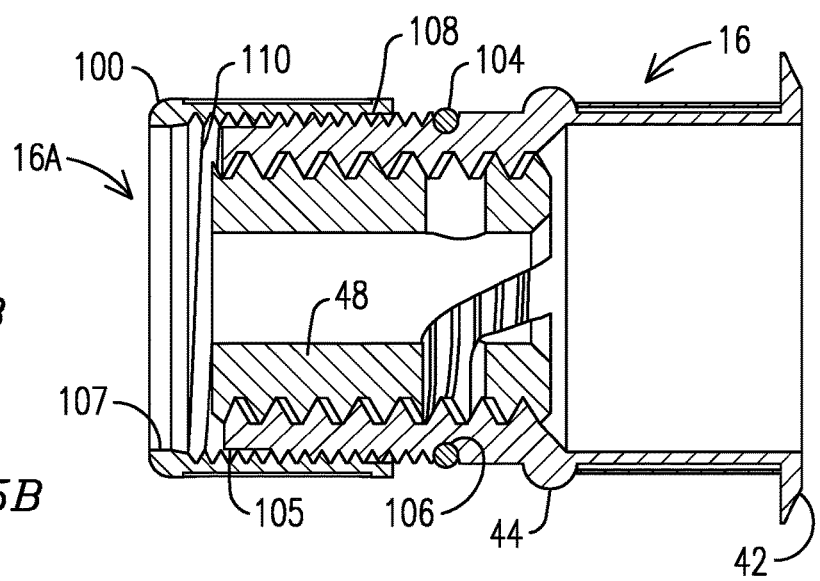
Figure 5C:
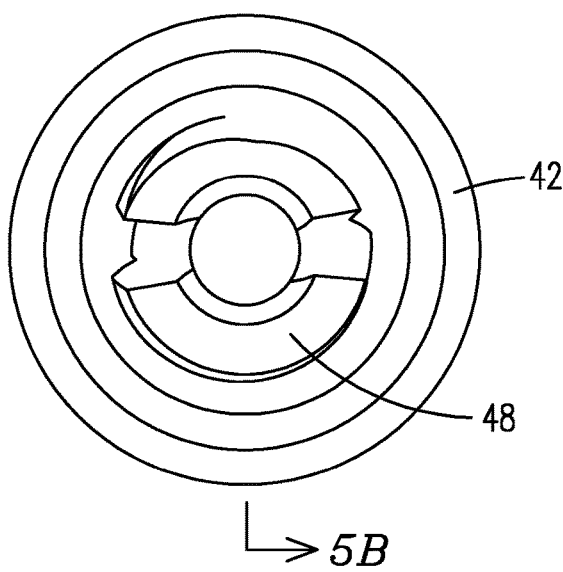
Figure 5D:
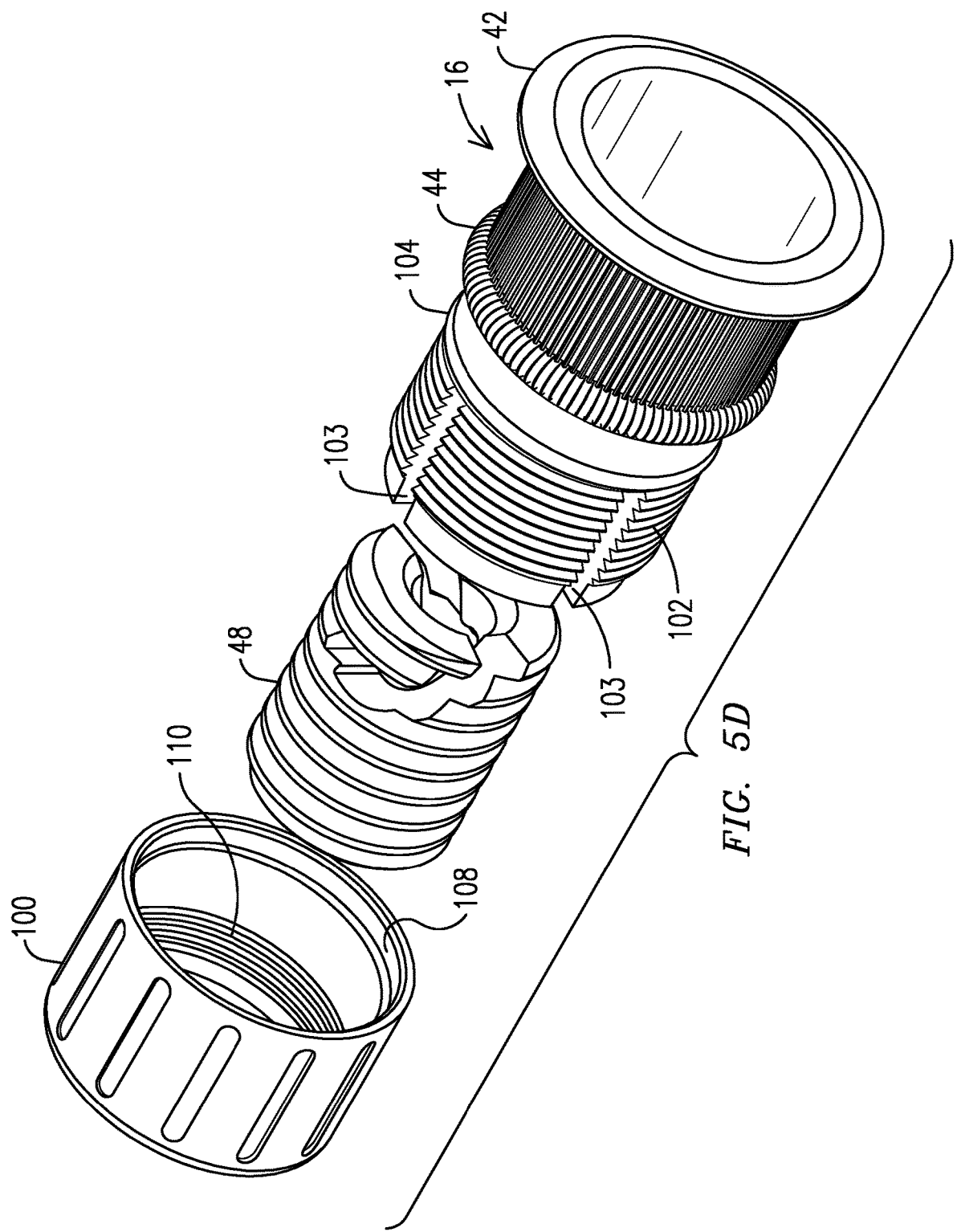

After the insert 48 has been positioned at the correct depth setting within the receptacle 16, the insert 48 is locked or affixed within the receptacle 16 so the position of the insert 48 is not longitudinally adjustable within the receptacle 16, using various methods. In one embodiment, the insert 48 may be treated with an adhesive such as Loctite® to lock or affix the insert 48 in the receptacle 16. In another embodiment shown in FIGS. 5A-5D, the receptacle 16 may have external threads 102 for receiving a lock cap 100 and lock the insert 48 in the receptacle 16. Internal threads 110 of the cap 100 engage the external threads 102 of the receptacle 16, to compress the receptacle 16 against the insert 48. In an exemplary embodiment, a circumference of the cap 100 or the receptacle 16 may be tapered from one end to another end, including external tapered threads 102 on the receptacle 16 and internal tapered threads 110 on the cap 100. This tapered arrangement of the cap 100 and the receptacle 16 enhances the compressive force exerted by the receptacle 16 on the insert 48, as the external tapered threads 102 of the receptacle 16 engage with internal tapered threads 110 of the cap 100. By threadably engaging the cap 100 over the receptacle 16, the receptacle 16 is pressed inward against the insert 48, thereby locking the insert 48 within the receptacle 16 and preventing the insert 48 from becoming dislodged from the receptacle 16. As illustrated in FIG. 5D, a plurality of slots 103 are formed along the external threads 102 of the receptacle 16, to divide the external threads 102 of the receptacle 16 into compressible sections that bend inward and press against the insert 48, upon engagement of the internal threads 110 of the cap 100 with the external threads 102 of the receptacle 16. As illustrated in FIG. 5B, the receptacle 16 includes a tapered end 105 at one end beyond the external threads 102, where an outer diameter of the tapered end 105 decreases towards the end of the receptacle 16. Upon the threaded engagement of the cap 100 with the receptacle 16, a seat 107 at an opening 16A of the cap 100 engages the tapered end 105 and presses the tapered end 105 inward against the insert 48, to lock the insert 48 within the receptacle 16 and prevent rotation of the insert 48. In an exemplary embodiment, an inner diameter of the seat 107 at the opening 16A is less than an outer diameter of the tapered end 105, to enhance the compressive force of the seat 107 against the tapered end 105. While this particular invention including the lock cap 100 is shown in combination with rivet nut receptacle 16, this invention is intended to be used with other fastener receptacles, and in particular ¼ turn fastener receptacles. For example, the invention could be used with the ¼ fasteners of the '180, '122, '843 and '329 patents.

After the insert 48 is locked within the receptacle 16, structural components are provided to prevent loosening of the insert 48 from its locked position within the receptacle 16. As illustrated in FIG. 5B, an O-ring 104 is seated in a groove 106 on an exterior of the receptacle 16 spaced from the bulge 44 toward the end of the receptacle 16 opposite to the flange 42. As shown in FIGS. 5A-5B, the groove 106 and O-ring 104 are disposed adjacent to the external threads 102. The cap 100 is internally threaded with internal threads 110. As the cap 100 is threaded onto the receptacle 16 radial forces or torsional forces are applied to the receptacle 16 and consequently the insert 48. The cap 100 includes an internal groove 108 that seats against the O-ring 104 when the cap 100 is tightened on the receptacle 16 so that when the internal groove 108 engages the O-ring 104, a predetermined amount of torque is required to longitudinally adjust the insert 48 within the receptacle 16. The engagement between the internal groove 108 and the O-ring 104 may be biased such that a level of resistance during tightening of the internal groove 108 on the O-ring 104 is greater than a level of resistance during loosening of the internal groove 108 from the O-ring 104. The engagement between the internal groove 108 and the O-ring prevents longitudinal adjustment of the insert 48 within the receptacle 16, as may occur when the panels 18, 20 and fastener 10 are subjected to vibrational forces. To that end, the O-ring 104 is positioned at a predetermined location relative to the end of the receptacle 16 such that when the internal groove 108 engages the O-ring 104 a set number of turns or rotations of the cap 100 will set the predetermined torque amount. This torque amount can then be adjusted by longitudinally adjusting the position of the insert 48 in the receptacle 16.

The pivoting handle assembly 40 is shown in detail in FIGS. 6-11 and includes a handle 50 operatively connected to the head 32 of the stud 14 to fold or pivot between an upright position (FIG. 8A) whereby the handle 50 is generally perpendicular to the panel 18 and a folded position (FIG. 8B) whereby the handle 50 is generally parallel to the panel 18. In the upright position, the handle 50 generally enables the quick turning of the stud 14 in the grommet 12 and receptacle 16 to quickly unfasten the outer panel 18 relative the inner panel 20 without the need of any specialized tools that fit the fastener 10. When a fastener 10 is installed the handle 50 may be pivoted to the folded position so the handle 50 is not in an obstructive position. In addition, as illustrated in FIG. 8B, the stud head 32 including a block 54 and a platform 56 prevent the handle 50 from pivoting past this folded position and striking the panel 18 surface.

Figure 9A:
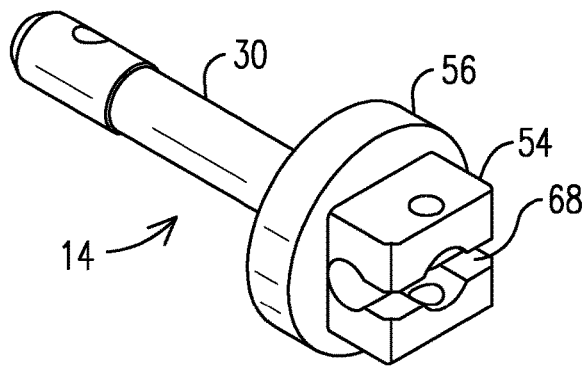
FIGS. 9A-9B include views of the shaft for the pivoting handle assembly according to embodiments of the present invention.
Figure 9B:
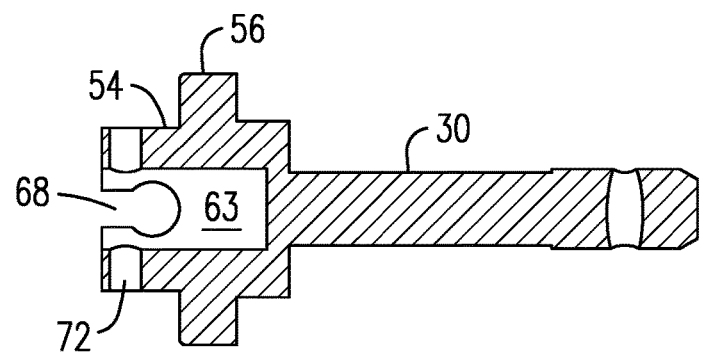

As illustrated in FIGS. 9A-9B, the head 32 of the stud 14 includes the block 54 formed on an enlarged area referred to as a platform 56. As illustrated in FIG. 9B, a central boring 63 is formed through the block 54 and the platform 56 for receiving a biasing mechanism 60 such as a coil/compression spring or one or more spring washers. In the embodiment shown in FIGS. 7A-7B, the biasing mechanism 60 is a compression spring. The biasing mechanism 60 biases the handle 50 or components of the handle against locking surfaces to lock the handle 50 to the stud 14. As shown in FIG. 6, a flat washer 58 may be disposed between the biasing mechanism 60 and the handle 50 to provide planar surfaces that engage the biasing mechanism 60 and handle 50.

Figure 10:
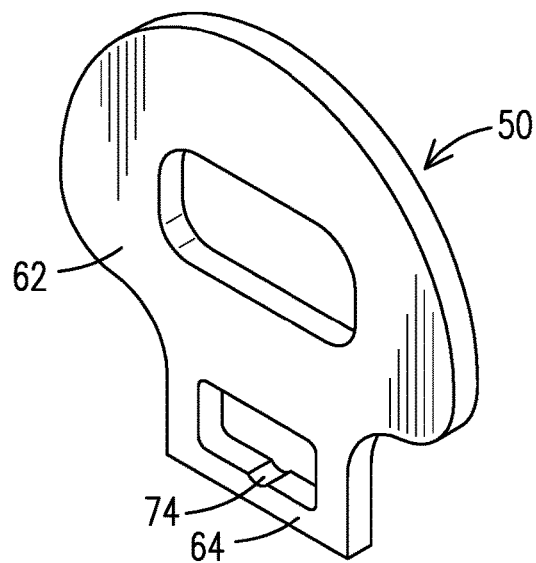
FIG. 10 includes a perspective view of the handle according to one embodiment of the present invention.
Figure 11:
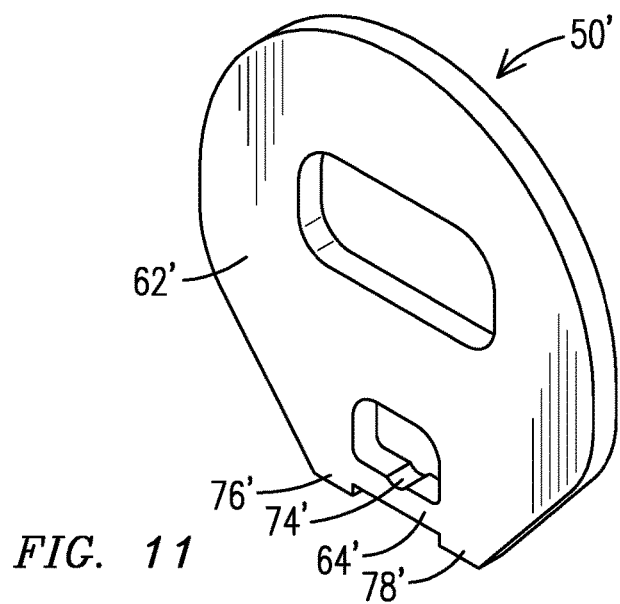
FIG. 11 includes a perspective view of a handle according to an alternate embodiment of the present invention.

The handle 50 includes a main body 62 for grasping and an axle 64 spaced from the main body 62 with an opening 66 there between. The axle 64 is inserted and disposed within a slot 68 (see, FIGS. 9A-9B) that extends through the block 54 laterally relative to a longitudinal axis of the stud 14. A locking pin 70 extends through apertures 72 in the block 54 and the opening 66. Thus, the axle 64 is disposed between the biasing mechanism 60 and the pin 70. The biasing mechanism 60 biases the axle 64/handle 50 outward relative to the boring 63, the block 54 and the stud head 32 and against the pin 70, and thus locks the handle 50 to the stud head 32. As shown in FIG. 10, the axle 64 includes an indentation 74 on or in which the pin 70 is seated. The biasing mechanism 60 biases the indentation 74 against the pin 70, locking the handle 50 on the shaft head 32 and thereby preventing or minimizing lateral movement of the handle 50. FIG. 11 illustrates an additional embodiment of a handle 50' with an axle 64' that includes an indentation 74' to seat the pin 70 and lock the handle 50' to the stud head 32. The axle 64' also includes a pair of legs 76', 78' at opposing ends of the axle 64' that extend outside the slot 68, when the axle 64' is disposed within the slot 68, and support the handle 50' on the platform 56 of the block 54 by preventing the handle 50' from tilting back and forth when the handle 50' is in the upright position. Additionally, the legs 76', 78' prevent the handle 50' from shifting laterally back and forth within the slot 68 when in the upright position, since the legs 76', 78' maintain the indentation 74' in engagement with the pin 70. Additionally, the legs 76', 78' inhibit downward movement of the handle 50' that would compress the biasing mechanism 60 and unlock the pin 70 from the indentation 74'.

While the FIGS. 2, 3 and 6-11 illustrate the pivoting handle assembly 40 in connection with a ¼ turn fastener, the assembly 40 may be used with other types of quick-release fasteners such as quick release screw fasteners, push to lock fasteners, 2× and 4× threaded fasteners.

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of power tools. Accordingly, it is intended that the invention be limited only by the spirit and scope of the appended claims.

The invention claimed is:

1. A fastener for securing together a first panel to a second panel, wherein the first panel and the second panel each include an aperture for receiving the fastener, and a first side of the first panel and the second panel are facing each other, and a second side of each is facing away from each other, comprising:
    a grommet having an opening and a radially outwardly extending flange for engaging the second side of said first panel;
    a receptacle being a rivet nut supported on the second panel and having a central opening facing the first side of the first panel and aligned with the respective apertures of the first panel and the second panel, and a portion of the receptacle is collapsible to form an outward, circumferential bulge against the second side of the panel; and,
    two diametrically opposed cam and locking surface arrangements associated with the receptacle for engaging a cross pin of a stud having been inserted through the grommet.

2. The fastener of claim 1, further comprising an insert including a cylindrical body in threaded engagement with an interior surface of the rivet nut receptacle and the insert further having a central opening, and the two cam and locking surface arrange are on the inert, wherein the central opening and the cam and locking surfaces receive and engage the cross pin of the stud.

3. The fastener of claim 1, wherein the receptacle includes internal threading between a first end of the receptacle and the two cam and locking surface arrangements.

4. A fastener for securing together a first panel to a second panel, wherein the first panel and the second panel each include an aperture for receiving the fastener, and a first side of the first panel and the second panel are facing each other, and a second side of each is facing away from each other, comprising:
    a grommet having an opening and a radially outwardly extending flange for engaging the second side of said first panel;
    a receptacle being a rivet nut supported on the second panel and having a central opening facing the first side of the first panel and aligned with the respective apertures of the first panel and the second panel; and,
    wherein the receptacle comprises:
        a cylindrical body including a first end, a second end opposite the first end, and a collapsible body section extending from the first end toward the second end and terminating spaced from the second end, and the collapsible body section is collapsible to form an outward, circumferential bulge against the second side of the second panel; and,
        two diametrically opposed cam and locking surface arrangements at the second end of the cylindrical body for engaging a cross pin of a stud having been inserted through the grommet.

5. The fastener of claim 4, further comprising an insert including a cylindrical body in threaded engagement with an interior surface of the rivet nut receptacle and the insert further having a central opening, and the two cam and locking surfaces are on the insert wherein the central opening and the cant and locking surfaces receive and engage the cross pin of the stud.

6. The fastener of claim 4, wherein the receptacle includes internal threading between a first end of the receptacle and the two cam and locking surface arrangements.

\* \* \* \* \*